W. F. GARRISON.
Water-Coolers.
No. 158,269.  Patented Dec. 29, 1874.
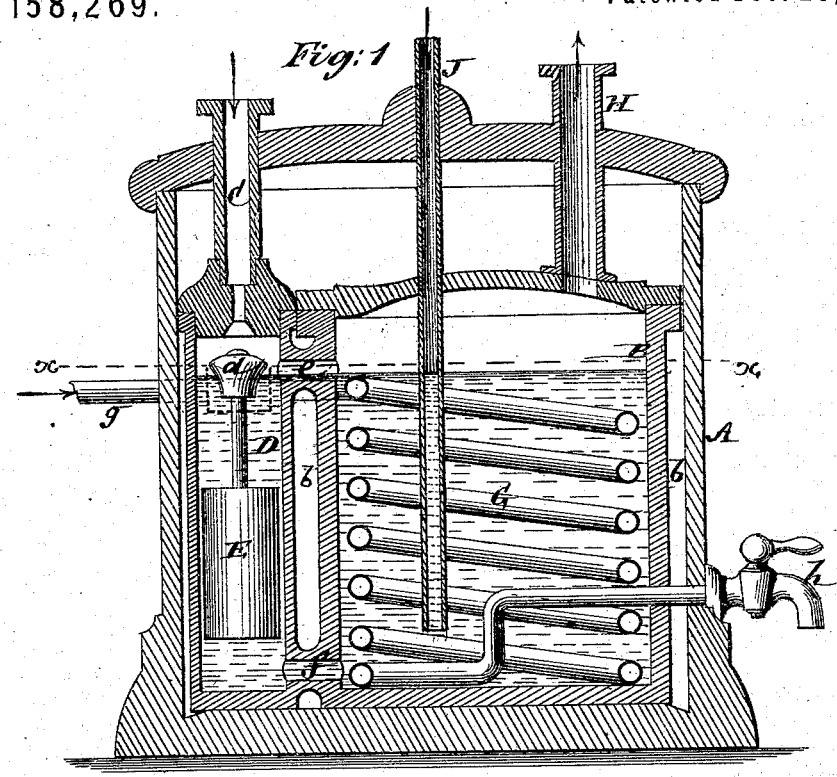
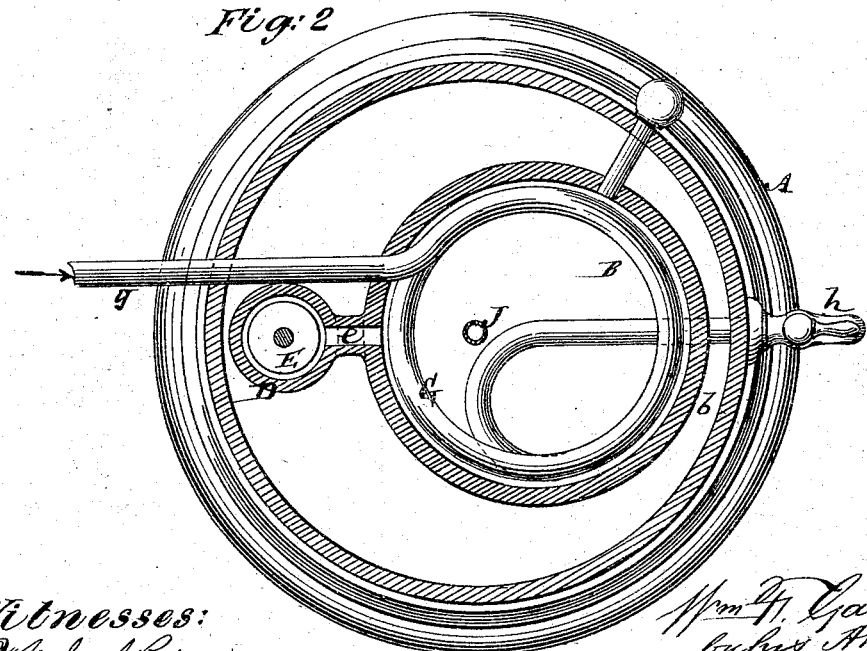
Witnesses:
Michael Ryan
Fred Haines
Wm. F. Garrison
by his Attorneys
Brown & Allen

UNITED STATES PATENT OFFICE.

WILLIAM F. GARRISON, OF BROOKLYN, NEW YORK.

IMPROVEMENT IN WATER-COOLERS.

Specification forming part of Letters Patent No. 158,269, dated December 29, 1874; application filed October 9, 1874.

*To all whom it may concern:*

Be it known that I, WILLIAM F. GARRISON, of the city of Brooklyn, in the county of Kings and State of New York, have invented certain Improvements in Apparatus for Cooling Water and other liquids, of which the following is a specification:

This invention consists in a novel construction of apparatus for cooling water or other liquids by the well-known process of evaporation *in vacuo*, or under a pressure less than the atmosphere, whereby great simplicity and efficiency are attained, and great convenience is afforded for cooling water for drinking and other purposes.

The apparatus is especially useful for cooling water in factories or buildings having a surplus power sufficient to work an air-pump to effect the necessary evaporation; but any known means of obtaining vacuums, as a steam-jet or a descending column of water, may be substituted for the air-pump. The apparatus may also be employed to manufacture ice; but such it is unnecessary to describe here.

In the drawing, Figure 1 represents a vertical section of my improved water or other liquid cooler, and Fig. 2 a horizontal section of the same, mainly on line *x x*.

A is the outer case of the cooler, constructed to receive within it the cooling-chamber B and pipes and other appurtenances connected therewith; likewise to collect all drip or leakage that may occur. Said cooling-chamber may be surrounded by an air-space, *b*, or packing-space, for charcoal or other non-conductor of heat, and is supplied with water or other liquid from any suitable source by a pipe, C, through the top of the cooler, and in communication below with a chamber, D. This chamber connects above and below, by passage *e f*, with the cooling-chamber B, and contains within it a loose float, E, which is furnished with a valve, *d*, that, whenever the water supplied by the chamber D reaches its maximum, or is in excess in the cooling-chamber B—that is, stands at or above the level of the top passage *e*—closes the inlet C, said valve, by its attached float, opening again to admit a further supply of water whenever the level of the latter in the cooling-chamber B approaches or reaches a lower level than it should stand at in the cooling-chamber. In this way the cooling-chamber B may be automatically supplied with cooling water or liquid in an adequate quantity, at all times, to insure a proper action and to keep the worm G fully or properly immersed. This worm, which has its inlet at *g*, and its outlet tap or cock at *h*, is arranged within the cooling-chamber B and contains the water or other liquid to be cooled by evaporation of or from the water or liquid in the chamber B, and, by its great and prolonged exposure of the liquid to be cooled, is of more than ordinary importance in a cooler of this description.

The air is exhausted from the upper space of the chamber B above the level of the water or liquid therein, and the vapor resulting from evaporation of the water is drawn off by a pump, by or through a pipe, H, so that a rapid reduction of the temperature of the water in the cooling-chamber B, and, through the latter, in the worm G, takes place.

Another pipe, J, which, like the pipes C and H, passes through the top or cover of the outer case A, is projected down within the cooling-chamber B and serves to admit a forced current of air within the water in the chamber B, the air entering said water near its bottom and circulating among and bubbling up through it, and serving as a vehicle to carry off the vapor of the water, and also as a means of agitating the water and facilitating its evaporation. This greatly assists the evaporation and expedites the cooling of the water; but care should be taken that the supply of air by the pipe J is limited, so as not to detrimentally reduce the vacuum or increase the pressure within the chamber B.

A gage, *b*, capable of inspection from the exterior of the apparatus, may be connected with the cooling-chamber B, to indicate the level of the water therein.

In case it may be desired to use the cooled liquid contained in the vessel B, the said liquid may be drawn off by a pump, or may be allowed to run off through an elongated pipe by gravitation, provided, in the latter case, it be placed high enough for the weight of the column in the said pipe to overcome the vacuum in the said vessel.

I claim—

The casing A having the chamber D provided with the valve $d$ and float E, in combination with the chamber B having the worm G and passages $e$ and $f$ communicating with the chamber D, the exhaust-pipe H, and air-inlet pipe J, substantially as and for the purpose described.

WM. F. GARRISON.

Witnesses:
HENRY T. BROWN,
MICHAEL RYAN.